(12) United States Patent
Peng

(10) Patent No.: US 10,424,895 B2
(45) Date of Patent: Sep. 24, 2019

(54) MODE-LOCKED FIBER LASER DEVICE

(71) Applicant: Industrial Technology Research Institute, Hsinchu (TW)

(72) Inventor: Jin-Long Peng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 7 days.

(21) Appl. No.: 15/840,255

(22) Filed: Dec. 13, 2017

(65) Prior Publication Data

US 2019/0181606 A1    Jun. 13, 2019

(51) Int. Cl.
*H01S 3/11* (2006.01)
*H01S 3/067* (2006.01)
*H01S 3/094* (2006.01)

(52) U.S. Cl.
CPC .......... *H01S 3/1106* (2013.01); *H01S 3/0672* (2013.01); *H01S 3/06712* (2013.01); *H01S 3/06754* (2013.01); *H01S 3/094003* (2013.01)

(58) Field of Classification Search
CPC .... H01S 3/083; H01S 3/0835; H01S 3/06712; H01S 3/06791; H01S 3/1106–3/1121
See application file for complete search history.

(56) References Cited

U.S. PATENT DOCUMENTS

| 5,050,183 A | 9/1991 | Duling, III |
| 5,359,612 A | 10/1994 | Dennis et al. |
| 5,448,579 A | 9/1995 | Chang et al. |
| 5,513,194 A * | 4/1996 | Tamura ............... H01S 3/06791 372/18 |
| 5,617,434 A * | 4/1997 | Tamura ............... H01S 3/06791 372/10 |

(Continued)

FOREIGN PATENT DOCUMENTS

| TW | I299928 | 8/2008 |
| TW | I436642 | 5/2014 |

(Continued)

OTHER PUBLICATIONS

Taiwan Patent Office, Office Action, Patent Application Serial No. 107100772, dated Jun. 12, 2018, Taiwan.

(Continued)

*Primary Examiner* — Joshua King

(57) ABSTRACT

A mode-locked fiber laser device is provided in the disclosure. The mode-locked fiber laser device includes a non-linear loop mirror, an optical splitter and a uni-directional loop. The uni-directional loop includes a polarization beam splitter and a Faraday rotator. The uni-directional loop is coupled to the non-linear loop mirror by the optical splitter to form a figure-8 optical path. A first output laser pulse output by the optical splitter is propagated to the polarization beam splitter. After being rotated 45 degrees by a Faraday rotator, the first output laser pulse is propagated back to the non-linear loop mirror to form a laser resonator. A second output laser pulse output by the optical splitter is propagated to the Faraday rotator to rotate the second output laser pulse 45 degrees, and the polarization beam splitter reflects the second output laser pulse to the outside of the mode-locked fiber laser device.

12 Claims, 5 Drawing Sheets

(56) References Cited

U.S. PATENT DOCUMENTS

| | | | |
|---|---|---|---|
| 5,898,716 A * | 4/1999 | Ahn | H01S 3/06791 |
| | | | 372/6 |
| 6,636,674 B2 | 10/2003 | Kim et al. | |
| 7,817,684 B2 | 10/2010 | Nicholson | |
| 7,940,816 B2 | 5/2011 | Nicholson | |
| 8,494,014 B2 | 7/2013 | Aguergaray et al. | |
| 8,873,601 B2 | 10/2014 | Haensel et al. | |
| 9,276,372 B2 | 3/2016 | Haensel et al. | |
| 2010/0061407 A1 * | 3/2010 | Nicholson | H01S 3/06791 |
| | | | 372/6 |
| 2016/0204565 A1 * | 7/2016 | Barre | H01S 3/108 |
| | | | 372/6 |

FOREIGN PATENT DOCUMENTS

| | | |
|---|---|---|
| TW | I521816 | 2/2016 |
| TW | I583087 | 5/2017 |
| WO | WO 0167806 A1 | 9/2001 |
| WO | WO 03014774 A2 | 2/2003 |
| WO | WO 03100363 A2 | 12/2003 |
| WO | WO 2006068875 A2 | 6/2006 |
| WO | WO 2006079078 A2 | 7/2006 |
| WO | WO 2017204299 A1 | 11/2017 |

OTHER PUBLICATIONS

J. W. Nicholson et al., "A polarization maintaining, dispersion managed, femtosecond figure-eight fiber laser," Optics Express, Sep. 2006, pp. 8160-8167, vol. 14, issue 18, Optical Society of America, US.

C. Aguergaray et al., "Mode-locked femtosecond all-normal all-PM Yb-doped fiber laser using a nonlinear amplifying loop mirror" Optics Express, Apr. 2012, pp. 10545-10551, vol. 20, issue 10, Optical Society of America, US.

H. Lin et al.,"Optimizing Polarization States in a Figure-8 Laser Using a Nonreciprocal Phase Shifter," Journal of Lightwave Technology, Jul. 1994, pp. 1121-1128, vol. 12, issue 7, IEEE, US.

N. Kuse et al.,"All polarization-maintaining Er fiber-based optical frequency combs with nonlinear amplifying loop mirror," Optics Express, Feb. 2016, pp. 3095-3102, Optical Society of America, US.

C. Aguergaray et al., "120 fs, 4.2 nJ pulses from an all-ormaldispersion, polarization-maintaining, fiber laser," Applied Physics Letters, Sep. 2013, pp. 121111-1-121111-4, vol. 103, issue 12, American Institute of Physics, US.

W. Hansel et al., "All polarization-maintaining fiber laser architecture for robust femtosecond pulse generation," Applied Physics B, Jan 2017, 6 pages, vol. 123, issue 41, Springer, US.

M. E. Fermann et al., "Additive pulse compression mode-locking of Neodynium fiber laser," Optics Express, Feb. 1991, pp. 244-246, vol. 16, No. 4, Optical Society of America, US.

I. N. Duling III, "All-fiber ring soliton laser mode locked with a nonlinear mirror," Optics Express, Apr. 1991, pp. 539-541, vol. 16, No. 8, Optical Society of America, US.

G. Sluyterman et al., "Comparison of numerical simulation of a polarization-maintaining figure-eight laser with experiment," Summaries of Papers Presented at the Conference on Lasers and Electro-Optics, May 1999, 8 pages, IEEE, US.

Y. Zhao et al., "High-power figure-of-eight fiber laser with passive sub-ring loops for repetition rate control," Optics Express, Oct. 2006, pp. 10475-10480, vol. 14, issue 22, Optical Society of America, US.

C. Aguergaray et al., "Experimental realization of a Mode-locked parabolic Raman fiber oscillator," Optics Express, Apr. 2010, pp. 8680-8687, vol. 18, issue 8, Optical Society of America, US.

* cited by examiner

MODE-LOCKED FIBER LASER DEVICE

TECHNICAL FIELD

The disclosure generally relates to mode-locked fiber laser technology, and more particularly, to mode-locked fiber laser technology for allocating a polarization beam splitter and a Faraday rotator in a uni-directional loop of a figure-8 laser structure to output the laser pulse.

BACKGROUND

As technology progresses, laser technology in particular is improving and advancing. A mode-locked ultra-short pulse fiber laser may generate a laser with high-peak power and a narrow pulse width, and as a result, the mode-locked ultra-short pulse fiber laser has the properties of wide bandwidth and high power output. Therefore, the mode-locked ultra-short pulse fiber laser may be applied in the surgical operations, fiber communications, frequency measurement, material processing, and other different technical fields.

In the conventional structure of the figure-8 mode-locked ultra-short pulse fiber laser, an isolator may be allocated in the uni-directional loop to isolate the propagation of the reverse laser pulse in the uni-directional loop. Therefore, the reverse laser pulse will be wasted. Therefore, how to make better use of the reverse laser pulse is a subject worthy of discussion.

SUMMARY

A mode-locked fiber laser device in which a polarization beam splitter and a Faraday rotator are allocated in a uni-directional loop to output the laser pulse are provided to overcome the problems mentioned above.

An embodiment of the disclosure provides a mode-locked fiber laser device. The mode-locked fiber laser device includes a non-linear loop mirror, an optical splitter and a uni-directional loop. The uni-directional loop comprises a polarization beam splitter and a Faraday rotator, wherein the uni-directional loop is coupled to the non-linear loop mirror through the optical splitter to form a figure-8 optical path. A first output laser pulse output by a first port of the optical splitter is propagated to the polarization beam splitter first, and after the Faraday rotator rotates the first output laser pulse 45 degrees, the first output laser pulse is propagated back to the non-linear loop mirror to form a laser resonator. A second output laser pulse output by a second port of the optical splitter is propagated to the Faraday rotator first to rotate the second output laser pulse 45 degrees, and the polarization beam splitter reflects the second output laser pulse to the outside of the mode-locked fiber laser device.

In some embodiments of the disclosure, the non-linear loop mirror comprises a non-reciprocal element.

In some embodiments of the disclosure, the optical splitter is a fiber coupler. In some embodiments of the disclosure, the optical splitter is a bulk optical element.

In some embodiments of the disclosure, the uni-directional loop further comprises a first half waveplate, and the first half waveplate is configured between the polarization beam splitter and the Faraday rotator. In some embodiments of the disclosure, the uni-directional loop further comprises a second half waveplate and the second half waveplate is configured in front of the polarization beam splitter.

Other aspects and features of the disclosure will become apparent to those with ordinary skill in the art upon review of the following descriptions of specific embodiments of the mode-locked fiber laser device.

BRIEF DESCRIPTION OF THE DRAWINGS

The disclosure will become more fully understood by referring to the following detailed description with reference to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
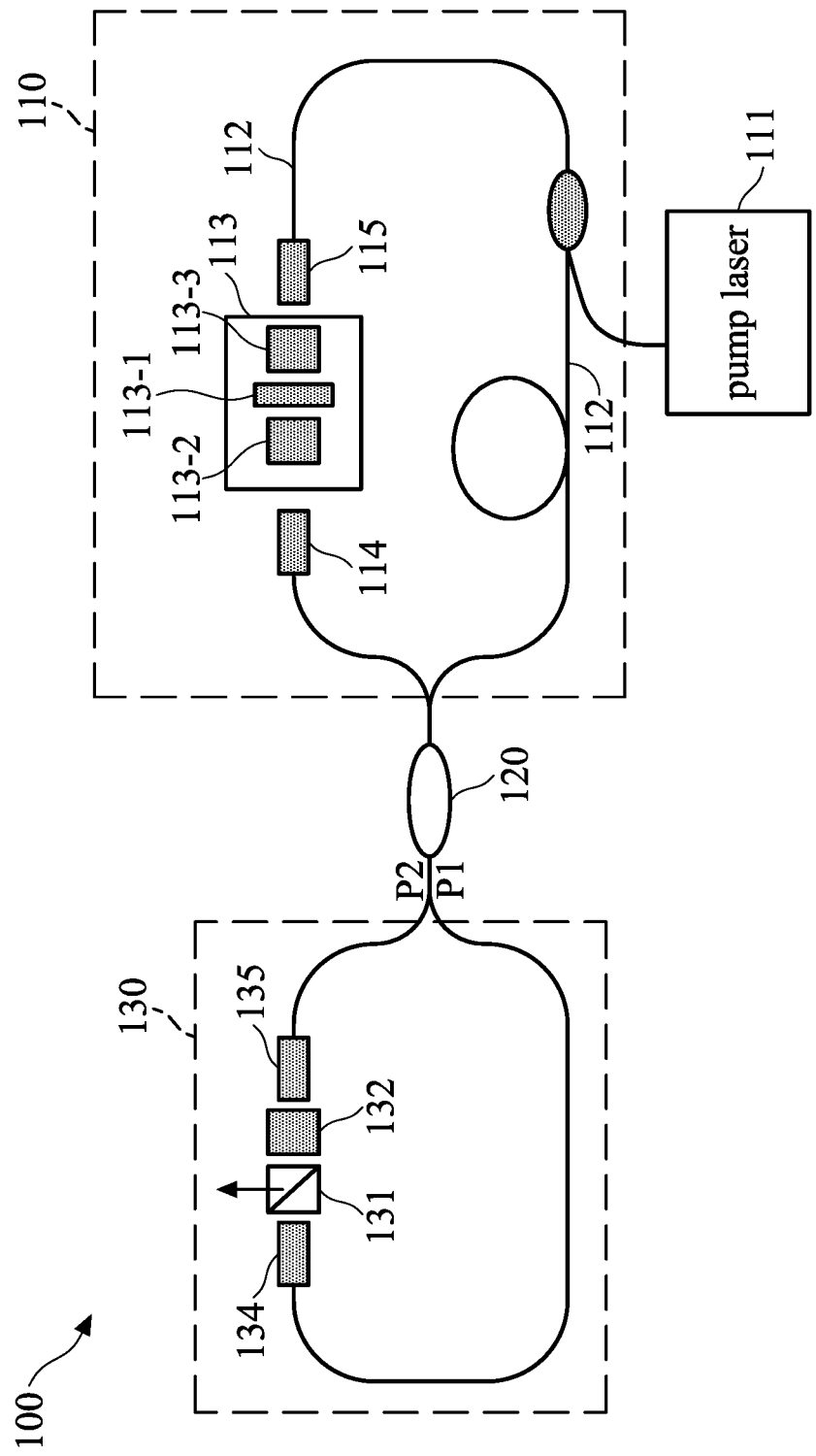
FIG. 1 is a schematic diagram of a mode-locked fiber laser device 100 according to an embodiment of the disclosure.

FIG. 1 is a schematic diagram of a mode-locked fiber laser device 100 according to an embodiment of the disclosure. As shown in FIG. 1, the mode-locked fiber laser device 100 may comprise a non-linear loop mirror 110, an optical splitter 120 and a uni-directional loop 130. Note that, in order to clarify the concept of the disclosure, FIG. 1 presents a simplified schematic diagram in which the elements relevant to the disclosure are shown. However, the disclosure should not be limited to what is shown in FIG. 1. The mode-locked fiber laser device 100 may also comprise other elements.

According to an embodiment of the disclosure, the non-linear loop mirror 110 may be a non-linear optical loop mirror (NOLM) or a non-linear amplification loop mirror (NALM). According to an embodiment of the disclosure, the non-linear loop mirror 110 is formed by the polarization maintaining fibers, but the disclosure is not limited thereto.

According to an embodiment of the disclosure, the non-linear loop mirror 110 may comprise a fiber amplifier. The fiber amplifier may comprise a pump laser (e.g. 111 as shown in FIG. 1), a gain medium and a wavelength division multiplexer (WDM), but the disclosure is not limited thereto. According to an embodiment of the disclosure, the pump laser may be a 980 nm pump laser, a 915 nm pump laser or a 1550 nm pump laser, but the disclosure is not limited thereto. According to an embodiment of the disclosure, the gain medium may be an Erbium-doped fiber, a Ytterbium-doped fiber, a Thulium-doped fiber, a Holmium-doped fiber, a Raman amplification medium or a Brillouin amplification medium, but the disclosure is not limited thereto. According to the embodiments of the disclosure, the pump laser 111 is utilized to provide the power to the gain medium to make the pulse signal which is propagated by the gain medium amplified.

According to an embodiment of the disclosure, the non-linear loop mirror 110 may comprise a non-reciprocal element 113. As shown in FIG. 1, according to an embodiment of the disclosure, the non-reciprocal element 113 may comprise a retardation waveplate (RW) 113-1 and Faraday rotators 113-2 and 113-3, but the disclosure is not limited thereto.

According to some embodiments of the disclosure, the non-reciprocal element 113 may be constructed by other non-reciprocal elements.

In the embodiments of the disclosure, in the non-linear loop mirror 110, two laser pulses with different directions (clockwise direction and counterclockwise direction) are respectively directed to input to the non-reciprocal element 113 through the collimators 114 and 115 to make the two laser pulses with different directions have different linear phases. In addition, the non-linear loop mirror 110 may propagate the two laser pulses with different directions (opposite directions) to the optical splitter 120 to make the two laser pulses with different directions interfere with each other in the optical splitter 120 to generate a first pulse laser output from a first port to the uni-directional loop 130 and generate a second pulse laser output from a second port to the uni-directional loop 130.

According to an embodiment of the disclosure, the non-linear loop mirror 110 may be coupled to the uni-directional loop 130 through the optical splitter 120 to form a figure-8 optical path (or figure-8 fiber laser). According to an embodiment of the disclosure, the optical splitter 120 may be a fiber coupler (as shown in FIG. 1). In the embodiment of the disclosure, the optical splitter 120 may have a symmetric splitting ratio (e.g. 50/50) or a non-symmetric splitting ratio (e.g. 60/40). For example, when the non-linear loop mirror 110 is a non-linear optical loop mirror (NOLM), an optical splitter 120 with a non-symmetric splitting ratio (e.g. 60/40) may be adopted, and when the non-linear loop mirror 110 is a non-linear amplification loop mirror (NALM), an optical splitter 120 with a symmetric splitting ratio (e.g. 50/50) may be adopted, but the disclosure is not limited thereto.

Figure 2A:
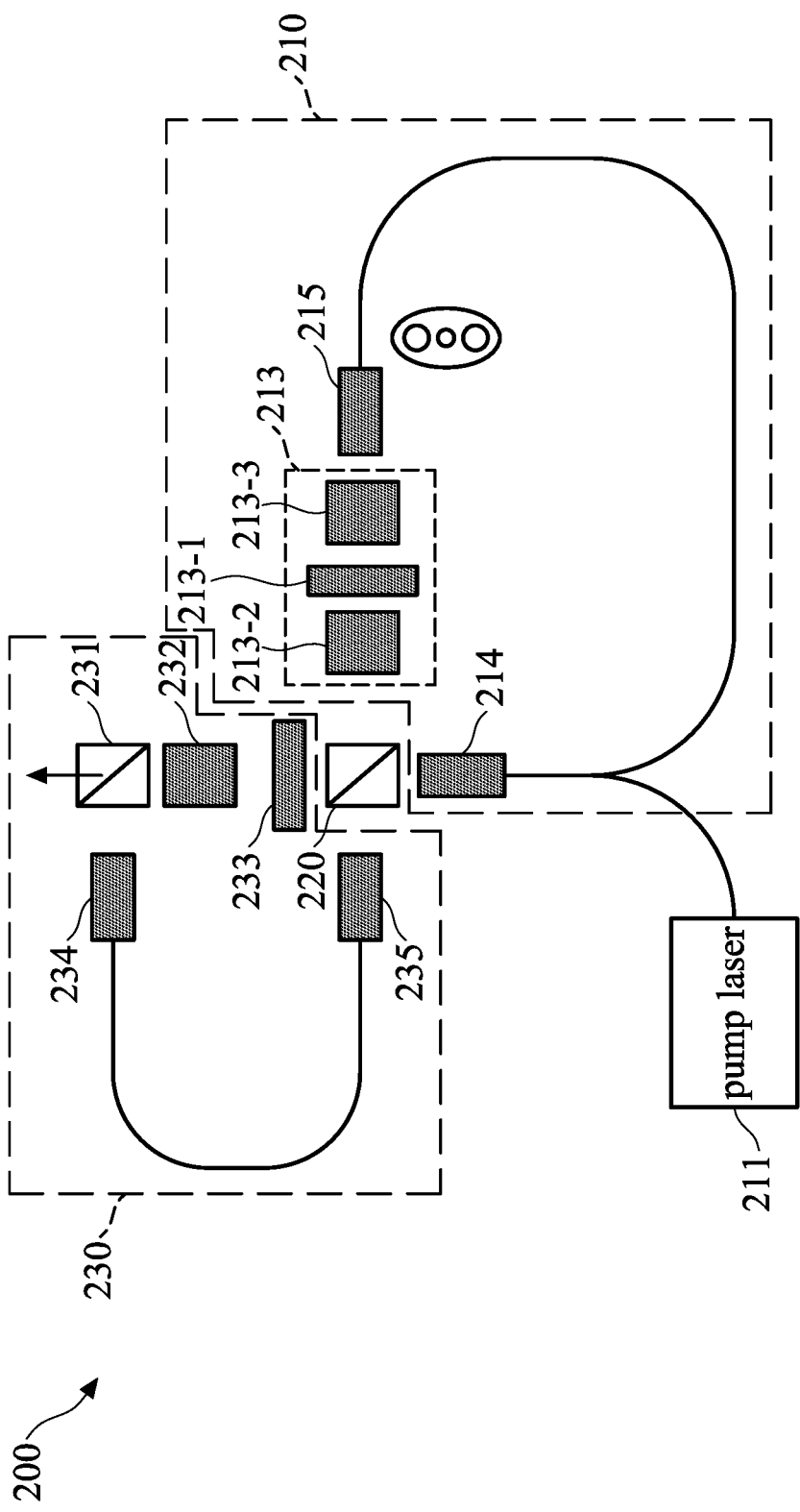
FIGS. 2A-2B are schematic diagrams of a mode-locked fiber laser device 200 according to another embodiment of the disclosure.
Figure 2B:
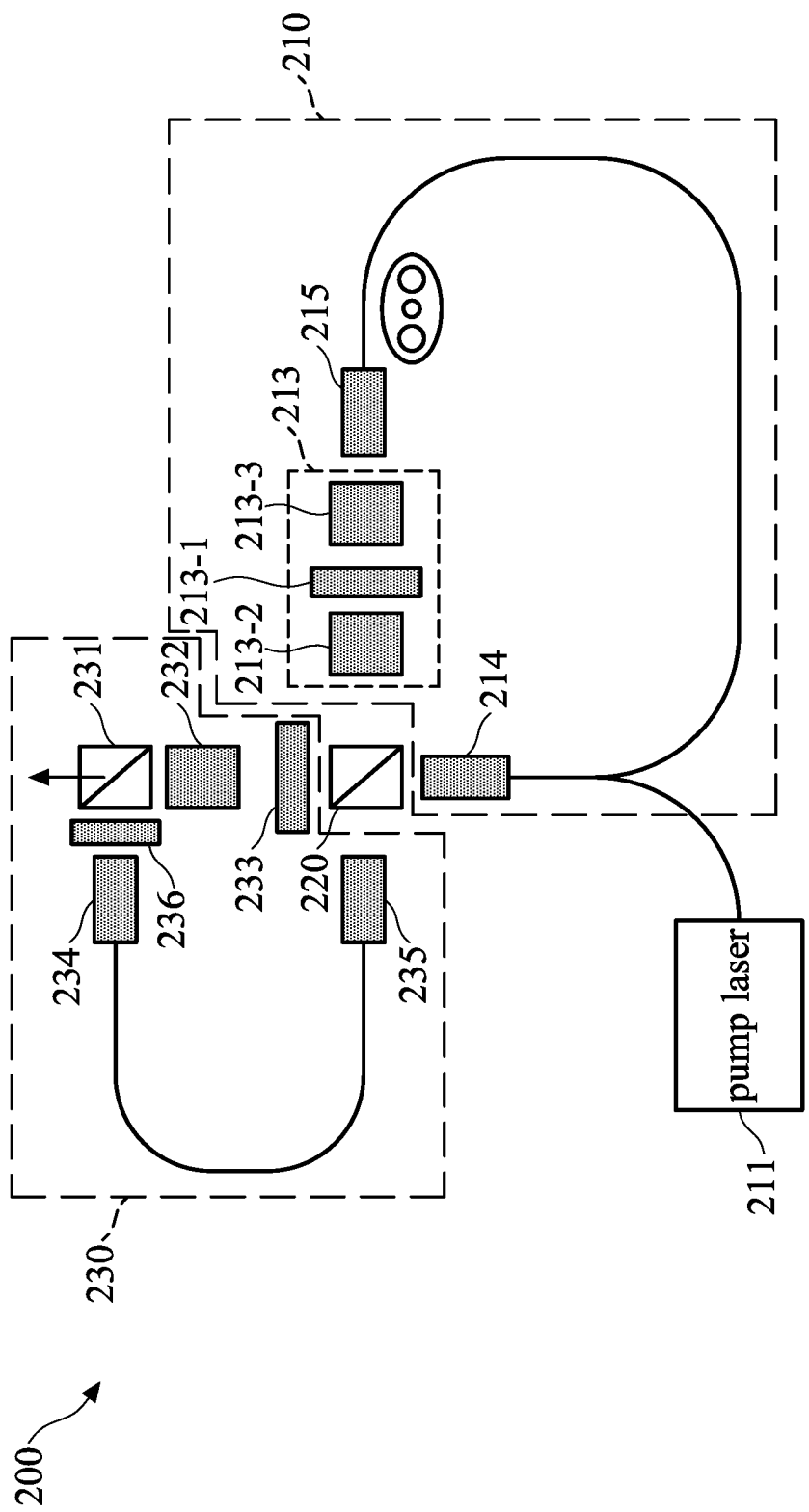

According to another embodiment of the disclosure, the optical splitter 120 may be a bulk optical element (or a bulk material) (as shown in FIGS. 2A and 2B), e.g. a beam splitter.

According to an embodiment of the disclosure, the uni-directional loop 130 comprises a polarization beam splitter 131 and Faraday rotator 132. According to an embodiment of the disclosure, the uni-directional loop 130 is formed by the polarization maintaining fibers, but the disclosure is not limited thereto.

According to an embodiment of the disclosure, it is assumed that the polarization beam splitter 131 may only allow the laser pulse which is in a direction parallel with the sheet to pass through the polarization beam splitter 131, and the polarization direction of the collimator 134 outputting the laser pulse is in a direction parallel with the sheet, but the disclosure is not limited thereto. The first laser pulse output from the first port P1 of the optical splitter 120 to the uni-directional loop 130 may be propagated to the polarization beam splitter 131 through the collimator 134 first. After the first laser pulse passes through the polarization beam splitter 131, the first laser pulse will be propagated to the Faraday rotator 132. The Faraday rotator 132 may rotate the polarization direction of the first laser pulse 45 degrees, and then the first laser pulse is coupled to the slow axis of the polarization maintaining fiber of the collimator 135. The slow axis of the polarization maintaining fiber of the collimator 135 may be tilted 45 degrees to fit the polarization direction of the first laser pulse and the collimator 135 may propagate the first laser pulse to the second port P2 of the optical splitter 120. Then, the first laser pulse may be propagated back to the non-linear loop mirror 110 to form a laser resonator (or laser cavity).

In addition, the second laser pulse output from the second port P2 of the optical splitter 120 to the uni-directional loop 130 may be propagated to the Faraday rotator 132 through the collimator 135 first. The Faraday rotator 132 may rotate the polarization direction of the second laser pulse 45 degrees according to the same rotation direction as the first laser pulse to make the polarization direction of the second laser become a direction perpendicular to the sheet, wherein the polarization direction of the second laser pulse is tilted 45 degrees before the Faraday rotator 132 rotating the polarization direction of the second laser pulse. Then, the second laser may be reflected (output) to the outside of the mode-locked fiber laser device 100 by the polarization beam splitter 131 to be used as the output laser.

FIGS. 2A and 2B are schematic diagrams of a mode-locked fiber laser device 200 according to another embodiment of the disclosure. As shown in FIG. 2, the mode-locked fiber laser device 200 may comprise a non-linear loop mirror 210, an optical splitter 220 and a uni-directional loop 230. Note that, in order to clarify the concept of the disclosure, FIG. 2 presents a simplified schematic diagram in which the elements relevant to the disclosure are shown. However, the disclosure should not be limited to what is shown in FIG. 2. Furthermore, the structure of the non-linear loop mirror 210 is similar to the non-linear loop mirror 110, therefore, the details will not be illustrated repeatedly herein.

Unlike the mode-locked fiber laser device 100, in the mode-locked fiber laser device 200, the optical splitter 220 is bulk optical element (or a bulk material). In FIGS. 2A-2B, a beam splitter is utilized to be the optical splitter 220, but the disclosure is not limited thereto.

In addition, as shown in FIGS. 2A-2B, the uni-directional loop 230 may comprise a polarization beam splitter 231, a Faraday rotator 232 and a half waveplate 233. Furthermore, in the embodiment of the disclosure, the uni-directional loop 230 is formed by the polarization maintaining fibers.

In the embodiment of FIG. 2A, it is assumed that the polarization directions of the laser pulses in the collimators 214, 215, 234 and 235 are in a direction perpendicular to the sheet and it is assumed that the direction of the slow axis of the polarization maintaining fiber in the collimators 214, 215, 234 and 235 are in a direction perpendicular to the sheet. Namely, in the embodiment, the laser pulse is propagated in the slow axis of the polarization maintaining fiber, but the disclosure is not limited thereto. The laser pulse may be propagated in the fast axis of the polarization maintaining fiber. After the laser pulses which are propagated in the non-linear loop mirror 210 in two different directions are propagated to the optical splitter 220, interference may be generated in the optical splitter 220, and then the optical splitter 220 may generate two laser pulses and respectively propagate the two laser pulses in two directions. The laser pulse propagated in a first path may be propagated to the polarization maintaining fiber through the collimator 235 and then propagated to the polarization beam splitter 231 through the collimator 234. The laser pulse output from the collimator 234 may be reflected to the Faraday rotator 232 by the polarization beam splitter 231. The Faraday rotator 232 may rotate the polarization direction of the laser pulse 45 degrees and then propagate the laser pulse whose polarization direction is rotated 45 degrees to the half waveplate 233. The half waveplate 233 may rotate the polarization direction of the laser pulse whose polarization direction has been rotated 45 degrees to a direction perpendicular to the sheet to make the laser pulse be able to be coupled to the slow axis of the polarization maintaining fiber.

In addition, in the embodiment of FIG. 2A, after the laser pulse propagated in a second path is propagated through the half waveplate 233 and the Faraday rotator 232, the polarization direction of the laser pulse may be in a direction parallel with the sheet. Then, the laser pulse is output to the outside of the mode-locked fiber laser device 200 by the polarization beam splitter 231 to be used as the output laser.

In the embodiment of FIG. 2B, it is assumed that the polarization directions of the laser pulses in the collimators 214, 215, 234 and 235 are in a direction parallel with the sheet and it is assumed that the direction of the slow axis of the polarization maintaining fiber in the collimators 214, 215, 234 and 235 are in a direction parallel with the sheet. Namely, in the embodiment, the laser pulse is propagated in the slow axis of the polarization maintaining fiber, but the disclosure is not limited thereto. In the disclosure, the uni-directional loop 230 further comprises a half waveplate 236. After the laser pulses which are propagated in the non-linear loop mirror 210 in two different directions are propagated to the optical splitter 220, interference may be generated in the optical splitter 220, and then the optical splitter 220 may generate two laser pulses and respectively propagate the two laser pulses in two directions. The laser pulse propagated in a first path may be propagated to the polarization maintaining fiber through the collimator 235 and then propagated to the half waveplate 236 through the collimator 234. The half waveplate 236 may rotate the polarization direction of the laser pulse output by the collimator 234 to a direction perpendicular to the sheet to make the laser pulse be able to be reflected back to the optical splitter 220 by the polarization beam splitter 231. In another embodiment, the half waveplate 236 may rotate the polarization direction of the laser pulse output by the collimator 234 to the direction tilted with the sheet to make part of the laser pulse be able to be reflected back to the optical splitter 220 by the polarization beam splitter 231 and make part of the laser pulse be able to be output to the outside of the laser resonator (or the mode-locked fiber laser device 200) by the polarization beam splitter 231 to be used as another output laser. The Faraday rotator 232 may rotate the polarization direction of the laser pulse 45 degrees and then propagate the laser pulse whose polarization direction is rotated 45 degrees to the half waveplate 233. The half waveplate 233 may rotate the polarization direction of the laser pulse whose polarization direction has been rotated 45 degrees to a direction parallel with the sheet to make the laser pulse be able to be coupled to the slow axis of the polarization maintaining fiber. In the embodiment of FIG. 2B, the combination of the half waveplate 236 and the collimator 234 whose direction of the slow axis is in a direction parallel with the sheet is able to be replaced by the collimator 234 whose direction of the slow axis is in a direction perpendicular to the sheet.

In addition, in the embodiment of FIG. 2B, after the laser pulse propagated in a second path being propagated through the half waveplate 233 and the Faraday rotator 232, the polarization direction of the laser pulse may be in a direction parallel with the sheet. Then, the laser pulse is output to the outside of the mode-locked fiber laser device 200 by the polarization beam splitter 231 to be used as the output laser.

Figure 3A:
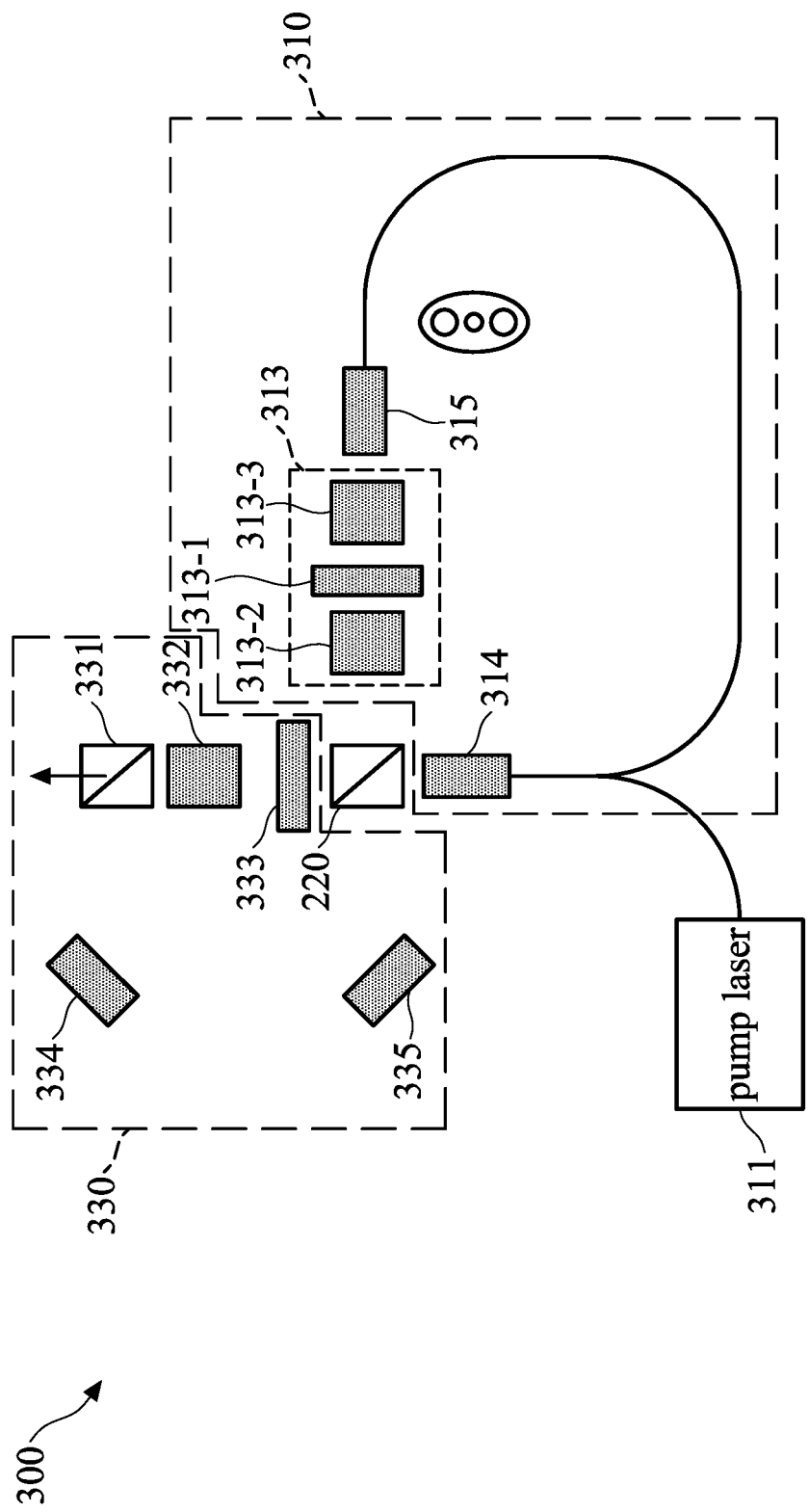
FIGS. 3A-3B are schematic diagrams of a mode-locked fiber laser device 300 according to another embodiment of the disclosure.
Figure 3B:
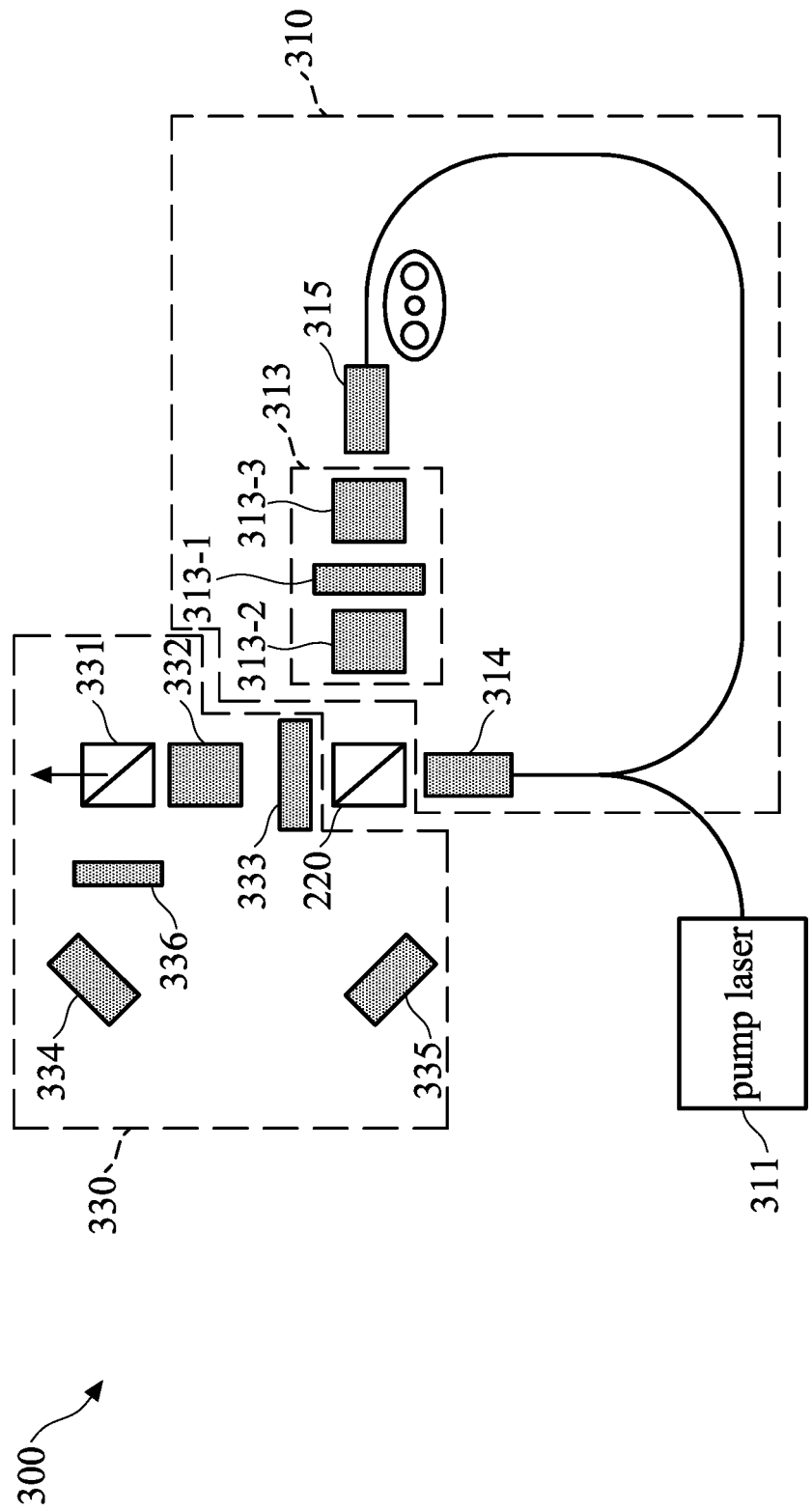

FIGS. 3A and 3B are schematic diagrams of a mode-locked fiber laser device 300 according to another embodiment of the disclosure. As shown in FIG. 3, the mode-locked fiber laser device 300 may comprise a non-linear loop mirror 310, an optical splitter 320 and a uni-directional loop 330. Note that, in order to clarify the concept of the disclosure, FIG. 3 presents a simplified schematic diagram in which the elements relevant to the disclosure are shown. However, the disclosure should not be limited to what is shown in FIG. 3.

Unlike mode-locked fiber laser device 200, in the embodiment, in the uni-directional loop 330 of the mode-locked fiber laser device 300, the mirrors 334 and 335 are utilized to replace the polarization maintaining fiber to propagate the laser pulses. Furthermore, the other structures of the non-linear loop mirror 310, the optical splitter 320 and the uni-directional loop 330 are similar to the non-linear loop mirror 210, the optical splitter 220 and the uni-directional loop 230, therefore, the details will not be illustrated repeatedly herein.

Compared with the structure of the conventional figure-8 mode-locked fiber laser device, in the figure-8 mode-locked fiber laser device of the disclosure, an isolator does not need to be allocated in the uni-directional loop of the mode-locked fiber laser device to isolate the propagation of the reverse laser pulse in the uni-directional loop. In addition, the figure-8 mode-locked fiber laser device of the disclosure can directly use the reverse laser pulse to be the output laser. Therefore, the reverse laser pulse will not be wasted.

Reference throughout this specification to "one embodiment" or "an embodiment" means that a particular feature, structure, or characteristic described in connection with the embodiment is included in at least one embodiment of the disclosure, but does not denote that they are present in every embodiment. Thus, the appearance of the phrases "in one embodiment" or "in an embodiment" in various places throughout this specification are not necessarily referring to the same embodiment of the disclosure.

The above paragraphs describe many aspects of the disclosure. Obviously, the teaching of the disclosure can be accomplished by many methods, and any specific configurations or functions in the disclosed embodiments present a representative condition. Those who are skilled in this technology will understand that all of the disclosed aspects in the disclosure can be applied independently or be incorporated.

While the disclosure has been described by way of example and in terms of preferred embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A mode-locked fiber laser device, comprising:
   a non-linear loop mirror;
   an optical splitter; and
   a uni-directional loop, comprising a polarization beam splitter and a Faraday rotator, wherein the uni-directional loop is coupled to the non-linear loop mirror through the optical splitter to form a figure-8 optical path,
   wherein a first output laser pulse output by a first port of the optical splitter is propagated to the polarization beam splitter first, and after the Faraday rotator rotates the first output laser pulse 45 degrees, the first output laser pulse is propagated back to the non-linear loop mirror to form a laser resonator, and
   wherein a second output laser pulse output by a second port of the optical splitter is propagated to the Faraday rotator first to rotate the second output laser pulse 45 degrees, and the polarization beam splitter reflects the second output laser pulse to the outside of the mode-locked fiber laser device.

2. The mode-locked fiber laser device of claim 1, wherein the non-linear loop mirror comprises a non-reciprocal element.

3. The mode-locked fiber laser device of claim 1, wherein the optical splitter is a fiber coupler.

4. The mode-locked fiber laser device of claim 3, wherein the fiber coupler has a symmetric splitting ratio or a non-symmetric splitting ratio.

5. The mode-locked fiber laser device of claim 1, wherein the optical splitter is a bulk optical element.

6. The mode-locked fiber laser device of claim 5, wherein the uni-directional loop further comprises a first half waveplate, and the first half waveplate is configured between the polarization beam splitter and the Faraday rotator.

7. The mode-locked fiber laser device of claim 5, wherein the uni-directional loop further comprises a second half waveplate and the second half waveplate is configured in front of the polarization beam splitter.

8. The mode-locked fiber laser device of claim 1, wherein the uni-directional loop propagates the first output laser pulse through polarization maintaining fibers.

9. The mode-locked fiber laser device of claim 1, wherein the uni-directional loop propagates the first output laser pulse through mirrors.

10. The mode-locked fiber laser device of claim 1, wherein when the non-linear loop mirror comprises a fiber amplifier, and the fiber amplifier comprises a gain medium.

11. The mode-locked fiber laser device of claim 8, wherein the gain medium is an Erbium-doped fiber, a Ytterbium-doped fiber, a Thulium-doped fiber, a Holmium-doped fiber, a Raman amplification medium or a Brillouin amplification medium.

12. The mode-locked fiber laser device of claim 1, wherein the non-linear loop mirror and the uni-directional loop are formed by polarization maintaining fibers.

* * * * *